United States Patent [19]

Peddinghaus et al.

[11] Patent Number: 5,368,538
[45] Date of Patent: Nov. 29, 1994

[54] METHOD OF AND APPARATUS FOR MACHINING STRUCTURAL SHAPES

[75] Inventors: Carl U. Peddinghaus, Obere Lichtenplatzer Strasse 276, 42287 Wuppertal, Germany; Reiner Pöting, Sprockhövel, Germany

[73] Assignee: Carl Ullrich Peddinghaus, Wuppertal, Germany

[21] Appl. No.: 116,884

[22] Filed: Sep. 7, 1993

[30] Foreign Application Priority Data

Sep. 22, 1992 [DE] Germany .............. 4231684

[51] Int. Cl.$^5$ .............. B23P 23/02; B23B 39/02; B23C 1/10
[52] U.S. Cl. .............. 483/1; 29/26 A; 29/33 P; 364/474.21; 408/26; 408/31; 409/159
[58] Field of Search .............. 29/26 R, 26 A, 560, 29/563, 564, 33 P, 56.5; 83/DIG. 2, 666; 408/31, 26, 42, 43, 44; 409/157, 159, 132, 131, 248, 237, 202, 212, 80; 364/474.02, 474.11, 474.21; 483/1, 4

[56] References Cited

U.S. PATENT DOCUMENTS

| | | | |
|---|---|---|---|
| 3,581,623 | 6/1971 | Galbarini | 409/237 |
| 3,614,909 | 3/1969 | Neuser | 409/248 |
| 4,604,705 | 8/1986 | Imanishi | 364/474.02 |
| 4,667,383 | 5/1987 | Peddinghaus | 29/26 A |
| 4,796,341 | 1/1989 | Kuhn II | 409/132 |
| 4,945,958 | 8/1990 | Shoda | 29/26 A |
| 5,161,298 | 11/1992 | Stursberg | 408/26 X |

FOREIGN PATENT DOCUMENTS

| | | | |
|---|---|---|---|
| 172105 | 2/1986 | European Pat. Off. | 408/31 |
| 3331844 | 1/1985 | Germany . | |
| 4023125 | 1/1992 | Germany . | |
| 134111 | 10/1981 | Japan | 408/31 |
| 39050 | 2/1985 | Japan | 408/31 |
| 159115 | 6/1989 | Japan | 408/31 |
| 145205 | 6/1990 | Japan | 408/31 |

Primary Examiner—William Briggs
Attorney, Agent, or Firm—Herbert Dubno

[57] ABSTRACT

A boring apparatus provided with feed and discharge roller conveyors for drilling holes in heavy steel structural shapes can be constructed so that at least one boring unit is transformable into a milling unit, the computer being programmed with a milling program. The mechanism for advancing the workpiece used for boring is thus used also for displacing the workpiece during milling so that milling tables upon which the workpiece must be clamped and the like need not be provided. The system also avoids the need to move the massive workpieces between boring/milling units.

14 Claims, 3 Drawing Sheets

METHOD OF AND APPARATUS FOR MACHINING STRUCTURAL SHAPES

FIELD OF THE INVENTION

Our present invention relates to an apparatus for machining structural shapes and, especially, heavy steel structural shapes. The invention also relates to a method of operating a machine or apparatus for machining such structural shapes and to the method of machining the structural shapes.

BACKGROUND OF THE INVENTION

The term "structural shapes" is here used to refer to large elongated bodies as used in the erection of buildings, bridges and like massive steel structures and wherever steel frameworks are intended to be provided, either as a core of a concrete structure or independently thereof. Typical structural steel shapes include I-beams, H-beams, channels, angles, bars and various cross sections, and more complex steel elements which generally are rolled in rolling mills from ingots and billets, blooms or continuously cast structures.

In steel fabrication it is of importance that such structural shapes be machined, usually drilled or bored with high precision, so that the structural shapes can be assembled at the building site with bolts or rivets. Frequently other machining of the workpiece is required, e.g. to cut the structural shape to size, to mill openings or steps in flanges or webs of the structural shape, or to cut intricate patterns in the web or flange.

All of these operations have generally been carried out on separate machines or at various locations in a fabrication yard or on the building site.

It is common, for example, to drill such structural shapes in an apparatus which comprises a machine frame, a feed-roller conveyor, a discharge-roller conveyor, a mechanism or means for advancing the workpiece along the roller conveyor and through the machine frame and a measuring unit for measuring this advance, at least one raisable and lowerable boring unit on the frame for boring vertical holes. In the structural shape or workpiece, at least one horizontal boring unit movable back and forth, and a computer-controller system connected to these units and to the advancing unit or drive for effecting a drilling program for the particular workpiece.

An apparatus of this type is available in various configurations. It can be combined, for example, with a sawing machine (see DE 40 23 125 A1) or associated with a cutting-torch system for burning the structural shape in various patterns (see DE 33 31 844 C1).

In general, the earlier apparatus has been found to be highly effective.

In the preparation of structural shapes, especially heavy steel structural shapes for the erection of steel frame structures, it frequently has been found to be desirable to effect a milling operation, especially to produce windows or compartments or cutouts in the flanges or webs of the structural shape.

In the past it has been required to shift the structural shape, i.e. the workpiece, from the drilling apparatus to the milling unit or vice versa.

The milling apparatus generally did not operate with feed and discharge-roller conveyors or with the mechanisms or means for advancing structural shapes along such conveyors as were provided in the boring machine. Instead, the workpiece commonly was clamped on the work table or milling machine slide or carriage and required accurate positioning thereon.

The carriage or slide or table upon which the workpiece was clamped was generally displaced by a spindle drive or the like.

As a consequence, the operations involved in transferring the workpiece to and from the milling machine and effecting a milling operating were time-consuming, expensive and frequently inaccurate because of the comparatively large size of the workpiece and the importance of correlating the bores formed or to be formed in the workpiece with any milling which may have been required.

OBJECTS OF THE INVENTION

It is, therefore, the principal object of the present invention to provide an improved apparatus which can be used for both the drilling and milling of heavy workpieces, especially structural shapes and particularly heavy structural steel shapes like I-beams and H-beams, whereby drawbacks of earlier systems can be avoided.

It is another object of this invention to provide an improved boring machine which has increased versatility and can allow for milling of the workpiece with minimal loss of time and with a high degree of precision.

Still another object of the invention is to provide an improved method of operating an apparatus for machining a structural shape and especially a heavy steel structural shape to avoid drawbacks of earlier techniques.

SUMMARY OF THE INVENTION

These objects and others which will become apparent hereinafter are attained, in accordance with the invention in an apparatus of the type described in which, at least one of the boring units is simultaneously formed as a milling unit and the boring tool or drill can be replaceable by a milling tool or cutter, wherein the computer of the control unit for the machine is additionally programmable with a milling software program and the control unit is constructed and arranged to control the advance of the workpiece also for the milling operations, i.e. with the displacement and rate of displacement necessary for effecting milling.

More particularly an apparatus for milling structural shapes, especially heavy steel structural shapes can comprise:
 a machine frame;
 a feed roller conveyor extending to the machine frame for feeding a structural shape to the machine frame;
 a discharge roller conveyor extending from the machine frame for carrying a structural shape away from the machine frame;
 at least one raisable and lowerable vertical boring unit shiftable on the machine frame and provided with a boring tool adapted to be rotated and displaced to form a pattern of vertical holes in a structural shape juxtaposed with the unit in the machine frame;
 at least one horizontal boring unit movable back and forth on the machine frame and provided with a boring tool adapted to be rotated and displaced to form a pattern of horizontal holes in a structural shape juxtaposed with the horizontal boring unit;
 control means for controlling advance of structural shapes juxtaposed with the boring tools and including a computer programmable with a drilling program adapted to form the pattern and operatively connected with the units for controlling the juxtaposition of a structural shape to be machined with the units and raising and lowering the vertical boring unit and displacing the horizontal boring unit back and forth in accordance with the program;

means at least one of the boring units for transforming same into a milling unit and substituting a milling cutter for the respective boring tool to enable milling away of the structural shape to be machined; and means at the computer for programming same with milling software enabling control of the milling unit and the milling of the structural shape to be machined in accordance therewith, the control means being constructed and arranged to enable milling control of the milling unit by the computer.

Preferably for the advance of the workpiece a unit or means is provided which includes at least one feed roller adapted to bear against the workpiece and at least one advance-measuring roller engaging the workpiece and responsive to the advance thereof, providing an input to the computer. In general two such feed-roller units are provided upstream and downstream of the drilling and milling units and along the feed and discharge conveyors and each feed-roller unit is provided with a responsive measuring roller.

The invention is based upon our surprising discovery that it is possible to carry out the milling operation on a structural shape and especially a heavy steel structural shape while it rides on the roller conveyors and is controlled by the feed rollers which normally position the structural shape for the drilling operation, without clamping of the workpiece, on the roller conveyors and without a spindle drive, for the milling operation by substituting a milling cutter for a drill with high accuracy and small tolerances. All that is required i.e. to construct at least one of the drilling unite so that it can simultaneously accommodate a milling cutter and can operate at the milling speeds which are desirable. The computer can be programmed with a milling software program and can control the feed or advance as well as the milling unit without difficulty.

Advantageously, the workpiece feed drive is equipped with the additional speeds required for the milling operation. Normally the advance of a workpiece during the milling operation will be slower than the speeds provided to position the workpiece for the boring operation.

As noted, the boring unit which is transformed into the milling unit should also be equipped with the additional slower speeds required for driving the milling cutter.

Utilizing the principles available from robotic machining stations, the boring tool and the milling cutter can be automatically interchangeable and, for example, a magazine or store can be provided from which the respective tool is withdrawn and inserted into the drive spindle of the boring/milling unit, the other tool being returned to the magazine.

The apparatus equipped to carry out both milling and drilling can be further provided with a sawing machine in the machine frame and the computer can be additionally programmed with sawing program software so that the advance of the workpiece and the operation of the sawing unit can be controlled by the computer.

Furthermore, the machine can be equipped with a burning unit or cutting torch and the computer can be programmed with a cutting-torch software program to control the displacement of the workpiece and the operation of the cutting-torch unit.

Advantageously the cutting torch unit can replace the milling cutter or the drill of the drilling unit.

BRIEF DESCRIPTION OF THE DRAWING

The above and other objects, features and advantages of the invention will become more readily apparent from the following description, reference being made to the accompanying highly diagrammatic drawing in which.

SPECIFIC DESCRIPTION

Figure 1:
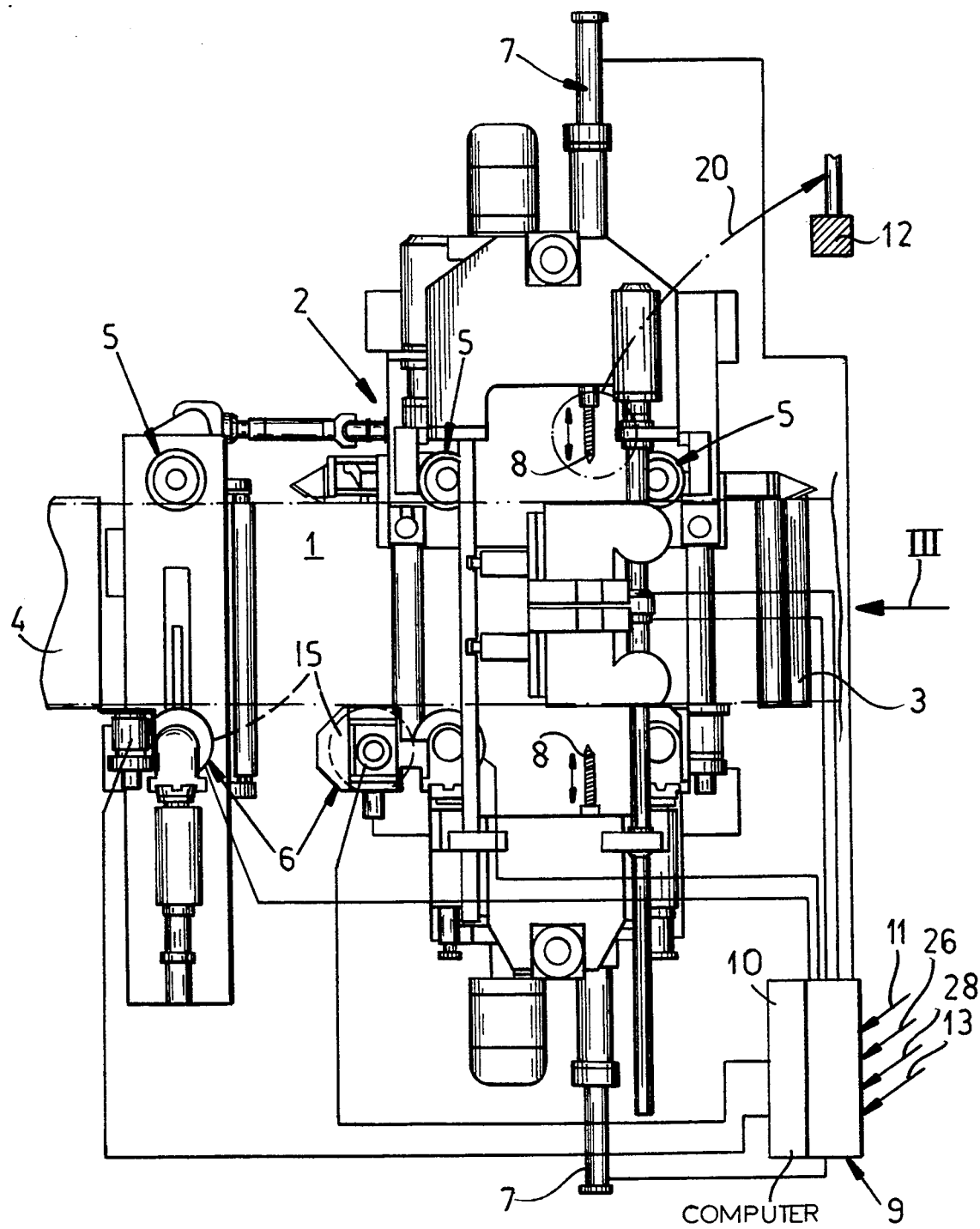
FIG. 1 is an elevational view, in highly diagrammatic form, of an apparatus in accordance with the present invention.
Figure 2:
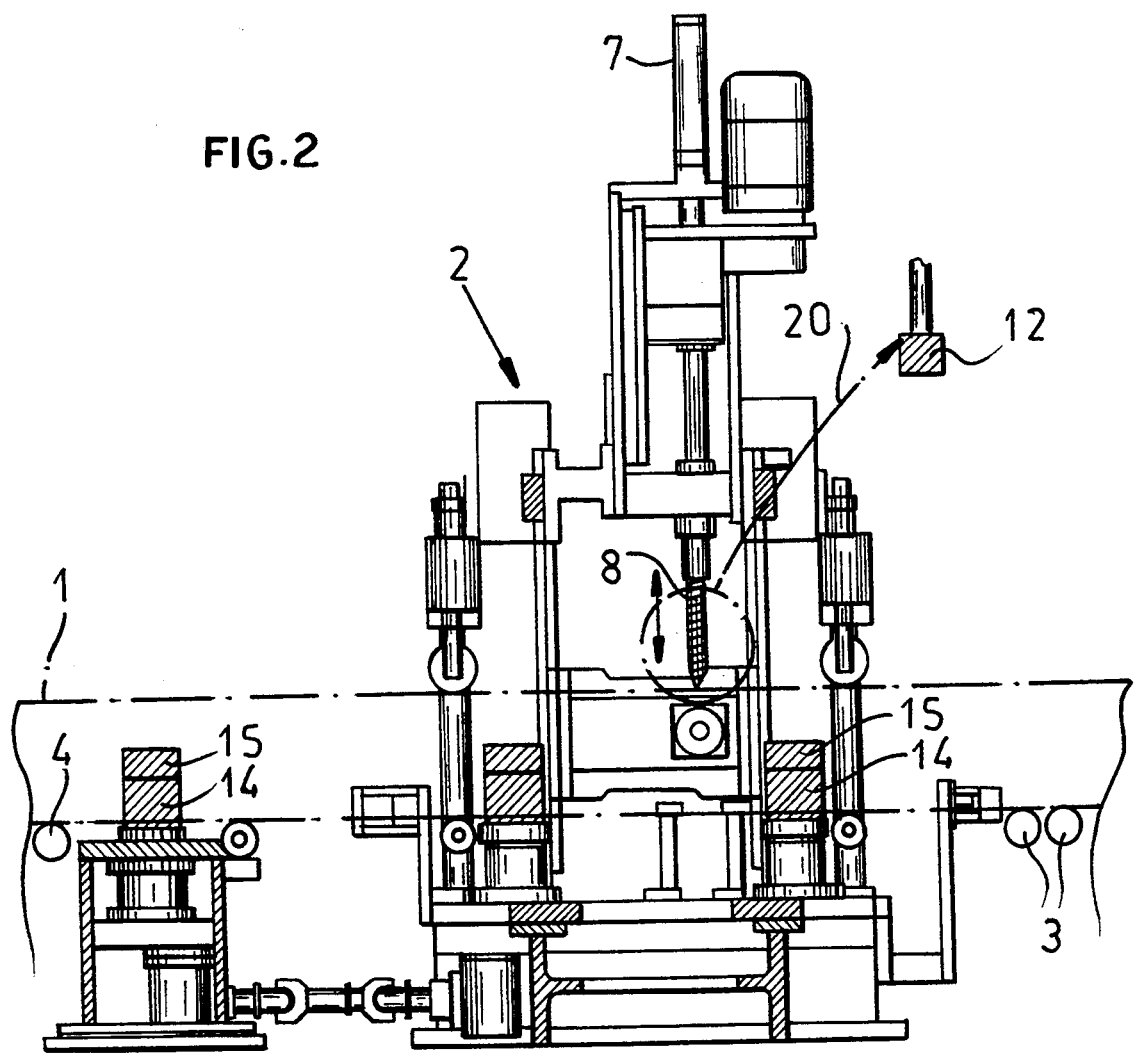
FIG. 2 is a cross sectional view taken along line II—II of FIG. 3 and showing the machine from the side.
Figure 4:
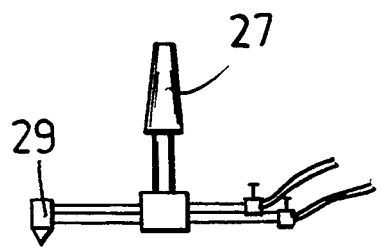
FIGS. 4 and 5 are diagrammatic elevational views showing, respectively, a cutting torch and a saw which can be mounted in the apparatus of FIGS. 1–3.
Figure 5:
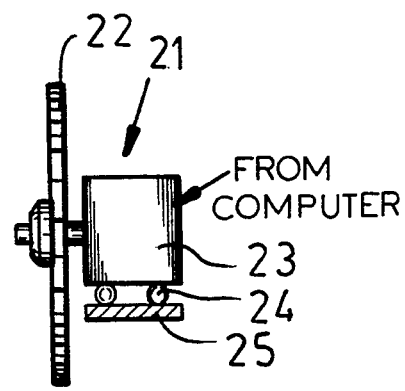
Figure 3:
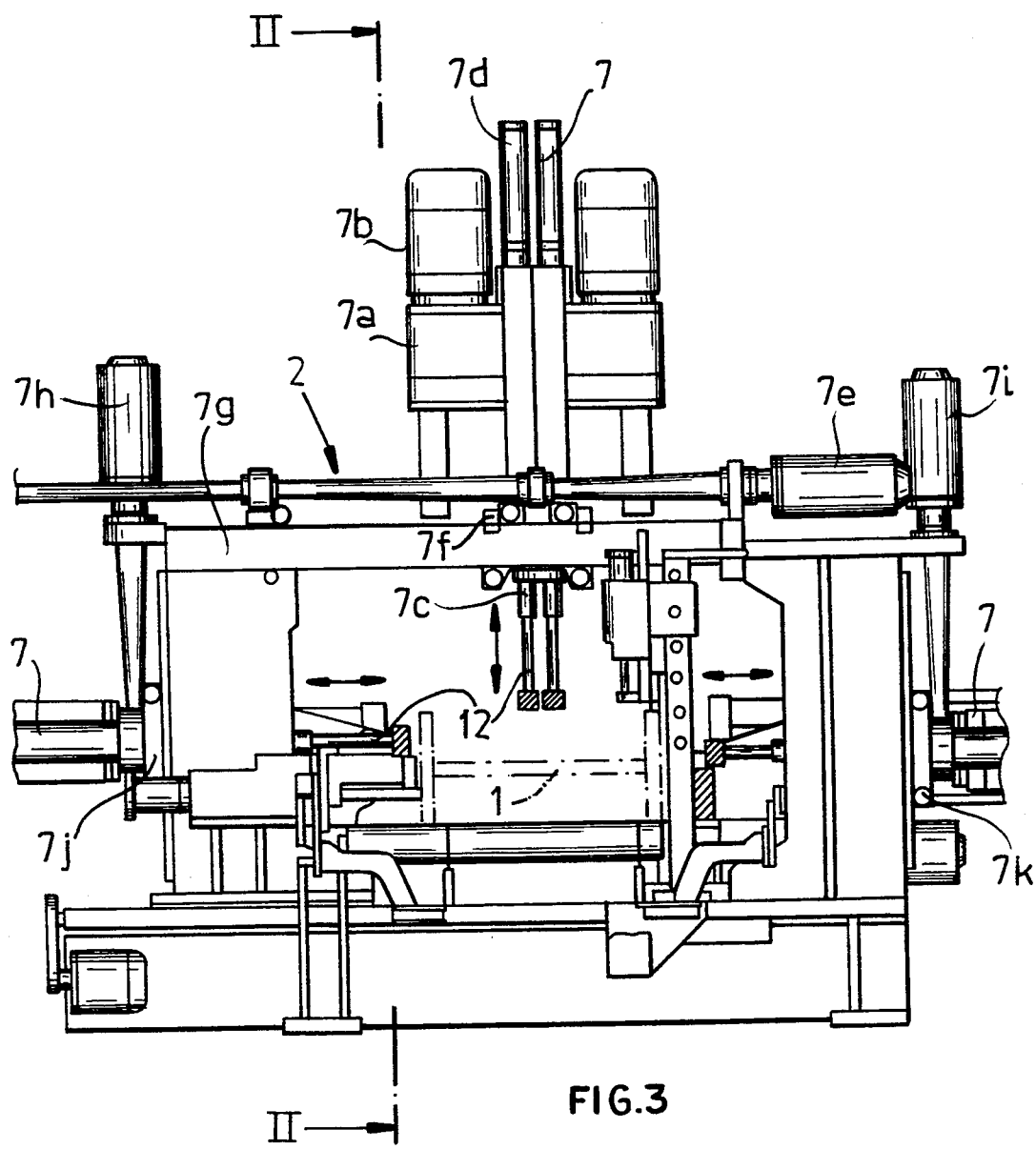
FIG. 3 is an end view of the apparatus seen in the direction of the arrow III in FIG. 1.

The apparatus of FIGS. 1–3 serves for the machining of structural shapes I which, in the illustration has an H-beam or I-beam and, in general, will be a heavy steel beam or girder.

The apparatus comprises a machine frame 2, upstream of which is provided a feed-roller conveyor 3 and downstream of which is a discharge-roller conveyor 4.

Each of these conveyors is provided with a feed unit 5 which can include a motor, transmission and rollers which frictionally engage the workpiece 1.

Associated with each of the feed units 5 is a respective advance-measuring device 6 which can include a roller frictionally engaging the workpiece and a signal generator which outputs a signal representing the linear displacement of the workpiece on the respective roller conveyor.

On the machine frame is at least one boring unit 7 which can be raised and lowered and serves as a vertical drill or boring head with one or more drill bits 8 which are replaceable on the spindle of the head.

The apparatus further includes at least one horizontal boring unit or head 7 which can be moved back and forth and is equipped with the boring tool or drill bit 8 which is replaceable in its spindle.

Each of the vertical boring heads and the horizontal boring heads can include a drive means represented as a speed-changing transmission 7a which can have a variety of rotary speeds for the control bit suitable for drilling and, in addition, a number of speeds suitable for milling selectable by the computer to be described in greater detail hereinafter.

In addition to the respective speed-changing transmission, each boring unit or head can include a motor 7b which can be turned on and off by the respective computer, the spindle 7c in which the drill bit or boring tool is removably received and a hydraulic or other servomotor 7d for linearly shifting the tool bit horizontally or vertically, depending upon the orientation of the unit, i.e. whether it is constructed as a vertical or horizontal boring tool.

To position each boring head transversely of the workpiece, servomotors 7e or the like can be provided to displace carriages 7f on rails 7g of the machine frame 2, the rails 7g extending transversely of the direction of displacement of the beam 1 on its lower conveyors.

For displacement of the horizontal boring tools vertically, similar servomechanisms can be provided, e.g. with motors 7h and 7k as illustrated in FIG. 3 to shift carriages 7j and 7k, for example.

Additional drives can be provided for fine positioning of the boring units in any direction. All of these servomechanisms can be controlled by the computer in accordance with the drilling program desired.

The computer 10 can be coupled to a control unit 9 which controls the advance of the workpiece, i.e. the positioning thereof, for the drilling operation. In general, the various movements of the drilling spindles have been shown by the double-headed arrows in the drawing.

The control unit 9 is provided with a computer 10 which is programmable with the boring program with a software input represented by the arrow 11. The arrow 11 thus represents means, e.g. a disk drive or the like, for inputting the boring software for programing the machine.

A comparison of FIGS. 1 and 2, where the tools are shown in their retracted positions, indicates that means represented by the arrow 20 can be provided for automatic replacement of the drill bit 8 by a milling cutter 12 at at least one of the boring units and preferably at all of the boring units.

The computer 10 also has means represented by the arrow 13 for programming the computer with milling software. The control unit 9 is constructed and arranged to provide the advance of the workpiece suitable for the milling operation and controls the boring units which have been transformed into milling units to position and advance the milling cutter. The programming and speed selection, in appropriate cases, are standard in machine-tool systems operated by modern machine control technology and thus these aspects of the invention need not be described in greater detail.

In the embodiment illustrated and in a preferred embodiment of the invention, each of the feed units 5 with their respective feed rollers 14 is associated with an advance measuring unit 6 having an advance measuring roller 15 engaging the workpiece.

From FIG. 1 it will be apparent that one such feed unit 5 is provided along the upstream roller conveyor and hence upstream of the boring unit or unit serving as a milling unit or milling units. A further transport device 5 is provided downstream of the milling unit along the respective roller conveyor.

The feed units 5 for advancing the workpiece can be equipped with additional speeds required for the milling operation, i.e. lower speeds than the speeds which may be used to position the workpiece for the boring operation.

The frame can be equipped with a sawing unit 21 having a blade 22 driven by a motor 23 on a carriage 24 shiftable on a rail 25 of the machine frame and controlled by the computer 10 which can be provided at 26 with a software input for the sawing operation software.

Finally, a cutting torch 29 can be mounted via its holder 27 in the spindle of one of the boring units which can be transformed into a milling unit so that the machine can be equipped with a cutting-torch system controlled by a torch-cutting software program 28 fed to the computer.

We claim:

1. An apparatus for machining structural shapes, especially heavy steel structural shapes, comprising:
   a machine frame;
   a feed roller conveyor extending to said machine frame for feeding a structural shape to said machine frame;
   a discharge roller conveyor extending from said machine frame for carrying a structural shape away from said machine frame;
   at least one raisable and lowerable vertical boring unit shiftable on said machine frame and provided with a boring tool adapted to be rotated and displaced to form a pattern of vertical holes in a structural shape juxtaposed with said unit in said machine frame;
   at least one horizontal boring unit movable back and forth on said machine frame and provided with a boring tool adapted to be rotated and displaced to form a pattern of horizontal holes in a structural shape juxtaposed with said horizontal boring unit;
   control means for controlling advance of structural shapes juxtaposed with said boring tools and including a computer programmable with a drilling program adapted to form said pattern and operatively connected with said units for controlling the juxtaposition of a structural shape to be machined with said units and raising and lowering said vertical boring unit and displacing said horizontal boring unit back and forth in accordance with said program;
   means at at least one of said boring units for transforming same into a milling unit and substituting a milling cutter for the respective boring tool to enable milling away of said structural shape to be machined; and
   means at said computer for programming same with milling software enabling control of said milling unit and the milling of said structural shape to be machined in accordance therewith, said control means being constructed and arranged to enable milling control of said milling unit by said computer.

2. The apparatus defined in claim i wherein, for control of advance of a structural shape, at least one of said roller conveyors is provided with driven feed rolls engageable with a structural shape to be advanced and controlled by said computer, and advance-measurement means including measurement rollers engaging a structural shape and entrained thereby for signalling advance of a structural shape to said computer.

3. The apparatus defined in claim 2 wherein driven feed rolls for control of advance of a structural shape are provided both upstream and downstream of said milling unit in a direction of advance of structural shapes through said frame.

4. The apparatus defined in claim 3 wherein the driven feed rolls upstream and downstream of said milling unit are each associated with a respective said measurement roller of said advance-measurement means.

5. The apparatus defined in claim 2 wherein said feed rolls are equipped with means affording additional speeds of advance of a structural shape for milling operations.

6. The apparatus defined in claim I wherein the boring unit transformed into said milling unit is equipped with a drive having additional speeds for a milling operation in addition to boring speeds.

7. The apparatus defined in claim 6 wherein said additional speeds for said milling operation are slower than said boring speeds.

8. The apparatus defined in claim 1, further comprising means for automatically replacing said boring tool of said one of said units with a milling cutter.

9. The apparatus defined in claim 1, further comprising a sawing unit on said machine frame controlled by said computer, said computer being provided with means for programming said computer with sawing-program software for controlled sawing of a structural shape with said sawing unit.

10. The apparatus defined in claim 1, further comprising a cutting-torch unit on said machine frame controlled by said computer, said computer being provided with means for programming said computer with cutting-torch program software for controlled burning of a structural shape with said cutting-torch unit.

11. The apparatus defined in claim 10 wherein said cutting-torch unit includes a cutting torch adapted to be mounted on said one of said units in place of said boring tool thereof.

12. A method of operating an apparatus for machining a structural shape, especially a heavy steel structural shape, said method comprising:
  (a) feeding a structural shape to a machine frame on a feed roller conveyor;
  (b) in response to drilling software programmed into a computer controlling displacement of said structural shape on said conveyor, and displacement of at least one raisable and lowerable vertical boring unit shiftable on said machine frame and provided with a boring tool adapted to be rotated and displaced to form a pattern of vertical holes, and at least one horizontal boring unit movable back and forth on said machine frame and provided with a boring tool adapted to be rotated and displaced to form a pattern of horizontal holes in said structural shape;
  (c) programming said computer with milling software;
  (d) replacing at least one of said boring tools at one of said units with a milling cutter, thereby transforming said one of said units into a milling unit;
  (e) milling said structural shape in response to said milling software under control of said computer while controlling displacement of said structural shape on said roller conveyor without clamping of said structural shape; and
  (f) displacing a machined structural shape away from said machine frame on a discharge roller conveyor.

13. The method defined in claim 12 wherein said frame is provided with a sawing unit, said method further comprising the steps of programming said computer with a sawing program, and controlling advance of a structural shape while sawing same with said sawing unit under control of said computer.

14. The method defined in claim 12, further comprising the steps of substituting a cutting torch for said boring tool at said one of said units, programming said computer with a cutting torch program, and controlling advance of a structural shape while controlledly cutting same with said cutting torch under control of said computer.

* * * * *